May 6, 1958 A. ELFERS 2,833,702

METHOD FOR THE MANUFACTURE OF A METAL RELIEF PRINTING PLATE

Filed March 21, 1955 2 Sheets-Sheet 1

May 6, 1958

A. ELFERS 2,833,702

METHOD FOR THE MANUFACTURE OF A METAL RELIEF PRINTING PLATE

Filed March 21, 1955

2 Sheets-Sheet 2

United States Patent Office 2,833,702

Patented May 6, 1958

2,833,702

METHOD FOR THE MANUFACTURE OF A METAL RELIEF PRINTING PLATE

Albertus Elfers, Haarlem, Netherlands, assignor to N. V. Quod Bonum, Haarlem, Netherlands, a corporation of the Netherlands Application March 21, 1955, Serial No. 495,458

Claims priority, application Denmark March 22, 1954

7 Claims. (Cl. 204—17)

This invention relates to methods for the manufacture of metal relief printing plates.

This application is a continuation-in-part of application Serial No. 359,168, filed June 2, 1953, now abandoned.

It is known from United States Patent No. 2,367,236 (January 16, 1945) to treat developed photomechanical copies on metal plates, after an etching operation, in a galvanic bath in order to precipitate a metal capable of being etched (such as, for example, zinc or copper) on those portions of the metal that are not covered with insoluble portions of the photomechanical layer. The current from the anode has a given current density (amperes per square cm.). As the metal plate acting as the cathode is partly covered with the insulating photomechanical layer the current will be concentrated on the other portions (the etched portions of the plate) and the current density will be highest where said etched portions are smallest.

This has for its result that in the small etching cavities (the dark parts) a thicker layer of metal will be deposited than in the larger etching cavities (the high lights). When the plate is subsequently again etched, the precipitated metal will protect the edges of the dots in proportion to the thickness of metal deposit; since this deposit is thickest in the small etching cavities, said portions (the dark parts) will be etched in lateral direction to a lesser extent than the small dots of the light parts.

By this method, a certain improvement of the contrast is obtained, but this improvement is not sufficient to obtain a satisfactory automatic etching process, at least not if relief printing plates of good quality are desired. In addition, the metal deposit thus obtained has a more or less coarse structure which has an unfavorable influence on the smoothness of uniform tones.

According to the invention, it is possible materially to increase the contrast by carrying out the galvanic treatment described above with an anode located at a distance of at most 3 millimeters from the relief printing plate functioning as the cathode.

The result of maintaining a small distance between anode and cathode is not only that the stream density on the bare metal areas in the dark parts of the printing plate is higher than in the bare metal areas in the light parts, but at the same time the concentration of the lines of force and accordingly also the stream density is substantially higher at the edges of the etching cavities than in the middle of the same.

The method according to the invention for producing improved printing plates is based on the last mentioned phenomenon. The difference in stream density between the edge and the middle of an etching cavity will be highest in the small cavities, i. e., in the dark parts. Owing to this difference in stream density a ring of metal will be formed around the etching cavities, whereas in the middle of said cavities the metal layer precipitated will be substantially thinner than the metal ring, i. e. the ring is partly formed from metal which would have been precipitated in the etching cavities if the anode distance would have been greater. The ring grows partly over the areas of the plate which are covered by the photomechanical layer.

If the distance between the anode and cathode is larger than 3 mm. the difference in stream density between the edge and the middle of the etching cavities will be much lower and the ring formation much less pronounced so that it will be of no practical value.

If now the plate thus treated is etched, these thick edges will project the dots of the relief in the dark parts against lateral attack, whereas the small dots in the high lights will be rapidly attacked. The contrast is thereby considerably increased, so that automatically the desired result is obtained.

It has also appeared that in the case of a small anode distance the structure of the precipitated metal is very fine and that the rings have a regular form. When the anode distance is larger the structure of the metal is coarser and the form of the relatively weak ring will be rather irregular. Owing thereto the dot will be irregularly attacked during the etching process and the print obtained therefrom will be unsatisfactory. If, on the other hand, the process according to the invention is carried out with the anode at a very small distance from the cathode the dots are regularly attacked and very even tones will be obtained. Owing to the fact that etching begins in the middle of the more or less dish-shaped metal deposit, etching cavities of a proper conical shape will be produced so that the dot will have the most desirable shape for producing satisfactory prints.

If desired the metal can be directly precipitated on the areas bared during the development of the exposed plate, but it is also possible to slightly etch the plate prior to the precipitation of the metal.

Various metals may be used for the printing plates according to the invention. It is possible, for example, to have a base plate of copper in which case copper will preferably be precipitated in the cavities. It is also possible to use a zinc plate and to precipitate zinc in the cavities.

According to a preferred embodiment a bimetal plate such as, for example, a zinc plate coated with a thin layer of nickel is used. In this case an etching agent dissolving both nickel and zinc, e. g. nitric acid, is preferably used and zinc is galvanically precipitated in the etching cavities.

The metals mentioned hereinbefore have only been mentioned by way of example and it is to be understood that the invention is not limited thereto.

The process according to the invention is preferably carried out by means of a so-called galvanic tampon. This is a flat metal plate on which a layer of felt or of another porous and soft material soaked with the liquid of the galvanic bath is provided. This tampon is moved with the side on which the felt is provided along the relief printing plate to be treated and acts as the anode, the printing plate being the cathode.

The invention will next be described with reference to the drawings in which.

Figure 1:
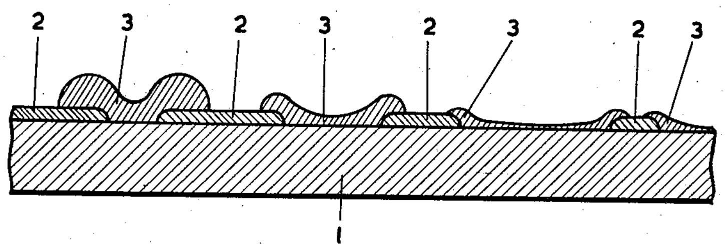
Figures 1 and 2 show cross sections of a plate in various stages of the treatment.

Referring to Figure 1, the plate 1, which for example, may consist of zinc, is coated with a photomechanical layer 2. After this layer has been exposed to an image to be reproduced, and developed in known manner, and after the plate has been slightly etched, a metal is electrolytically precipitated on the etched areas; this metal may be the same as that of the plate or another metal. The precipitation is effected by using an anode consisting of the desired metal, said anode being located at a very slight distance from the printing plate acting as the cathode. A cross section of the plate after this treatment is shown in Figure 1. It will be seen that the deposited metal 3 is not only located in the cavities between the remaining portions of the photomechanical layer 2 but that it has also grown over said layer and that this deposit is much stronger in the small etching cavities than in the larger cavities.

Figure 2:
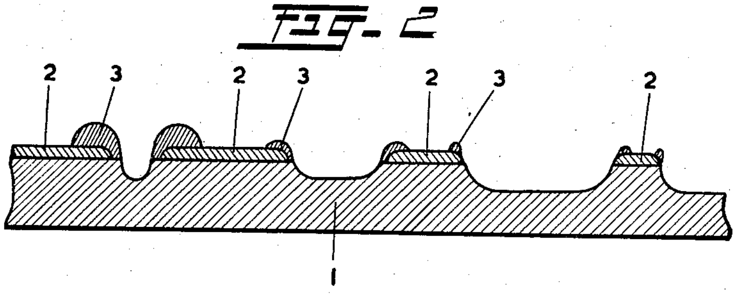

If next the plate is etched again the etching will penetrate much further at the places where only a thin layer of metal has been deposited than at other places, as shown in Figure 2. The portions of the photomechanical layer still present in this stage may be removed in known manner.

The invention may be carried out in various ways, both with a static and with a moving electrode. In the first case, the electrolyte may be circulated along the electrodes.

Figure 3:
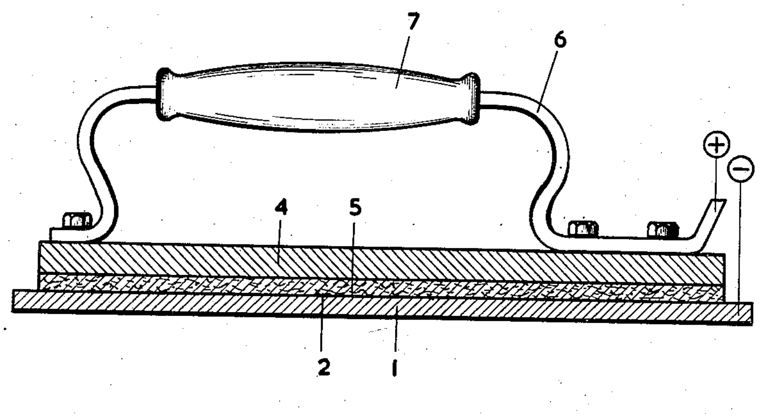
Figure 3 shows a cross section through an apparatus suitable for carrying out the galvanic treatment.

Suitable apparatus for carrying out the invention will be described with reference to Figures 3–5.

According to a first embodiment of the invention, a galvanic tampon is used for the electrolytical precipitation of the metal. This tampon which is shown in Figure 3 has more or less the shape of a flat iron and comprises a plate 4 which is covered with a layer of felt 5 and provided with a handle composed of a conducting portion 6 with an insulating covering 7. After the felt has been soaked with the solution of the electrolyte, the device is connected with a source of current, the arrangement being such that the tampon forms the anode and the relief printing plate, the cathode and the tampon is moved to and fro across the printing plate. This treatment is continued until the desired amount of metal is precipitated, which generally is the case after a short time.

Figure 4:
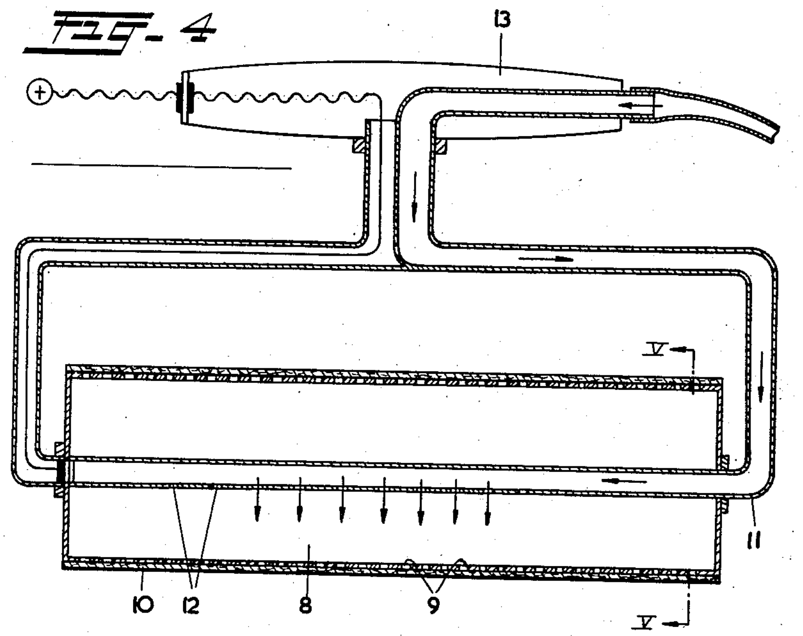
Figure 4 shows a cross section through a second apparatus suitable for carrying out the galvanic treatment.
Figures 5, 6:
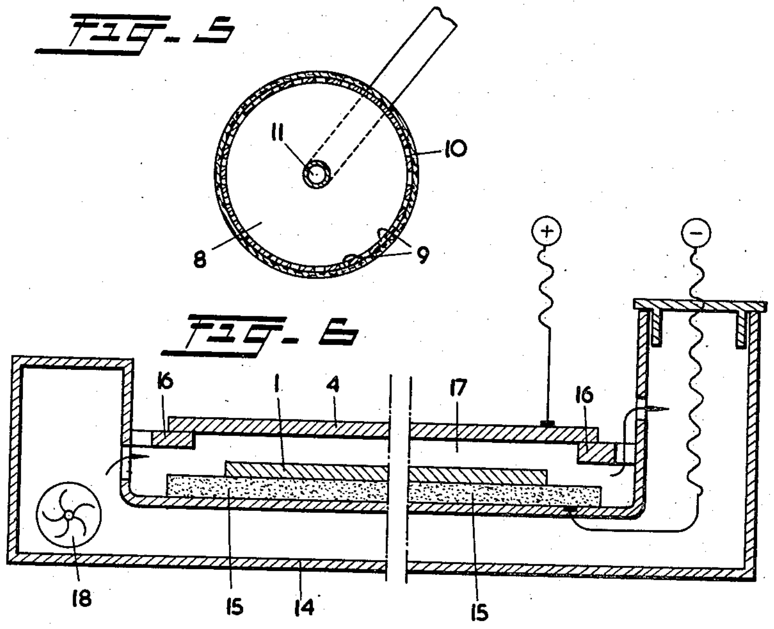
Figure 5 shows part of a cross section of the same apparatus, perpendicular to the cross section of Figure 4.
Figure 6 shows a cross section of a third apparatus for carrying out the galvanic treatment.

Another device for precipitating the metal comprising a moving anode is shown in Figures 4 and 5. A metal roll 8 with perforations 9 is covered with a felt layer 10 having a thickness of 2–3 mm. The electrolyte solution is supplied through the hollow axis 11 provided with perforations 12. The roll forms the anode, the metal printing plate (not shown in the drawing) the cathode of an electrical circuit. For this purpose, the roll is provided with a handle 13 which is connected with the positive pole of the source of current and also with the supply for the electrolyte solution. In order to precipitate the metal on the printing plate, the roll is uniformly moved along the surface of the same.

Figure 6 shows a device with a static anode. 14 is a container consisting of plexiglass or another suitable material and having a double bottom. The printing plate 1 to be etched is superimposed on the cathode plate 15. The metal anode plate 4 is arranged at a distance of about 3 mm. of the upper side of the printing plate by means of supports 16. The electrolyte solution 17 is circulated between the plates and returned through the double bottom of the container by means of the pump 18.

I claim:

1. A method including the use of a current-supplying anode for the manufacture of a metal relief printing plate comprising coating a metal plate with a photomechanical layer, next exposing said layer to an image to be reproduced and developing said layer, electrodepositing a metal on the bared areas of the plate in a galvanic bath in which the plate functions as the cathode while the anode is at a distance of less than 3 millimeters from the cathode, etching the plate with an etching agent capable of dissolving the electro-deposited metal and the base metal and then removing the remaining portions of the photo-mechanical layer.

2. A method according to claim 1, in which the bared areas of the plate after the development are slightly etched, prior to the treatment in the galvanic bath.

3. A method according to claim 1, in which the plate consists of a metal base which is provided with a thin coating of another metal soluble in the etching liquid.

4. A method accordinging to claim 3, in which the metal base consists of zinc and a coating of nickel.

5. A method according to claim 1 in which the metal is electro-deposited from the galvanic bath by passing over the printing plate an anode consisting of a flat metal plate covered with a layer of a soft and porous material of a thickness of less than 3 millimeters impregnated with said galvanic bath.

6. A method according to claim 1 in which the metal is electro-deposited from the galvanic bath by rolling over the printing plate an anode consisting of a metal cylinder covered with a layer of a soft and porous material of a thickness of less than 3 millimeters impregnated with said galvanic bath.

7. A method according to claim 1, in which the metal is electro-deposited from the galvanic bath by circulating said galvanic bath between the anode and the printing plate arranged in parallel position at a distance of less than 3 millimeters.

References Cited in the file of this patent

UNITED STATES PATENTS

| | | |
|---|---|---|
| 1,787,431 | Batenburg et al. | Jan. 6, 1931 |
| 2,108,700 | Adey | Feb. 15, 1938 |
| 2,367,236 | Murray | Jan. 16, 1945 |
| 2,647,864 | Goffredo | Aug. 4, 1953 |